United States Patent
Urmston et al.

(10) Patent No.: US 7,856,525 B2
(45) Date of Patent: Dec. 21, 2010

(54) CONTENT ADDRESSED STORAGE DEVICE CONFIGURED TO MAINTAIN CONTENT ADDRESS MAPPING

(75) Inventors: Richard Urmston, Westboro, MA (US); William McConnell, Boston, MA (US)

(73) Assignee: EMC Corporation, Hopkinton, MA (US)

( * ) Notice: Subject to any disclaimer, the term of this patent is extended or adjusted under 35 U.S.C. 154(b) by 35 days.

(21) Appl. No.: 12/217,061

(22) Filed: Jun. 30, 2008

(65) Prior Publication Data

US 2008/0270684 A1 Oct. 30, 2008

Related U.S. Application Data

(63) Continuation of application No. 10/984,686, filed on Nov. 8, 2004, now Pat. No. 7,444,464.

(51) Int. Cl.
*G06F 12/00* (2006.01)

(52) U.S. Cl. ............... 711/108; 711/202; 711/E12.001

(58) Field of Classification Search ............... None
See application file for complete search history.

(56) References Cited

U.S. PATENT DOCUMENTS

| | | | |
|---|---|---|---|
| 6,298,401 | B1 | 10/2001 | Anderson |
| 6,925,524 | B2 * | 8/2005 | Chow et al. ............... 711/108 |
| 2003/0070006 | A1 | 4/2003 | Nadler et al. |
| 2003/0191992 | A1 | 10/2003 | Kaminsky et al. |
| 2004/0019670 | A1 | 1/2004 | Viswanath |
| 2004/0186972 | A1 | 9/2004 | Chow et al. |
| 2004/0205077 | A1 | 10/2004 | Cabrera et al. |

FOREIGN PATENT DOCUMENTS

| | | |
|---|---|---|
| EP | 893902 | 1/1999 |
| WO | WO 97/44762 | 11/1997 |
| WO | WO 99/08173 | 2/1999 |
| WO | WO 2004/074968 | 9/2004 |

OTHER PUBLICATIONS

Daniel Gilly and the staff of O'Reilly & Associates, Inc., UNIX in a Nutshell, 1992, O'Reilly & Associates, pp. 2-47 and 2-48.*
Tolia et al., "Opportunistic use of Content Addressable Storage for Distributed File Systems," Proceedings of the USENIX Annual Technical Conference, General Track 2003. Jun. 2003.

* cited by examiner

*Primary Examiner*—Shawn X Gu
(74) *Attorney, Agent, or Firm*—Van Pelt, Yi & James LLP

(57) ABSTRACT

A content addressed storage device configured to maintain content address mapping is disclosed. A data object to be stored on the content addressed storage device and a local data object identifier by which the data object is known to the sending source are received from a sending source. A content address to be associated with the data object on the content addressed storage device is determined based at least in part on the contents of the data object. The data object is stored on the content addressed storage device in a storage location associated with the content address. A mapping that associates the local data object identifier with the content address is maintained on the content addressed storage device.

21 Claims, 6 Drawing Sheets

CONTENT ADDRESSED STORAGE DEVICE CONFIGURED TO MAINTAIN CONTENT ADDRESS MAPPING

CROSS REFERENCE TO OTHER APPLICATIONS

This application is a continuation of co-pending U.S. patent application Ser. No. 10/984,686 U.S. Pat. No. 7,444, 464 entitled CONTENT ADDRESSED STORAGE DEVICE CONFIGURED TO MAINTAIN CONTENT ADDRESS MAPPING filed Nov. 8, 2004 which is incorporated herein by reference for all purposes.

U.S. patent application Ser. No. 10/984,687 entitled CONTENT ADDRESSED STORAGE DEVICE WITH WEB SERVICES INTERFACE is incorporated herein by reference for all purposes; and co-pending U.S. patent application Ser. No. 10/984,678 entitled IMPLEMENTING APPLICATION SPECIFIC MANAGEMENT POLICIES ON A CONTENT ADDRESSED STORAGE DEVICE is incorporated herein by reference for all purposes.

FIELD OF THE INVENTION

The present invention relates generally to data storage. More specifically, a content addressable storage device configured to maintain content address mapping disclosed.

BACKGROUND OF THE INVENTION

Content addressed storage (CAS) devices store typically fixed content in a storage server typically accessed via a network. An example is the Centera™ CAS device made and sold by EMC™ Corporation of Hopkinton, Mass. Typically, an application sends data to the CAS device to be stored, the CAS device determines a storage location by calculating a "content address" (CA) based at least in part on the content to be stored, after which the CAS device stores the content in the selected location and returns the content address to the application that sent the data. The content address is used like a claim check to enable the storing application (or, in theory, another application to which the CA has been provided) to retrieve (and in some cases perform other limited operations, e.g., delete) the previously stored content.

Under the typical approach described above, an application must be configured to receive the content address and track a mapping between the content address and a local object identifier (e.g., a file name and/or path) by which the stored data object is known on the local system on which the application is running. This limits the use of CAS devices to those applications configured to maintain such a mapping and consumes time and resources on the local system. For some types of application, the functionality for maintaining such a mapping may already exist or be relatively easy to incorporate, but for other applications the required level of data tracking may become an obstacle to using a CAS device for storage.

Therefore, there is a need for a way to enable applications to use a CAS device for storage without requiring that the application maintain a mapping between the content address associated with the data on the CAS device and the local object identifier (e.g., local file system name and/or path) of the data object on the local system on which the application is running.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process, an apparatus, a system, a composition of matter, a computer readable medium such as a computer readable storage medium or a computer network wherein program instructions are sent over optical or electronic communication links. In this specification, these implementations, or any other form that the invention may take, may be referred to as techniques. In general, the order of the steps of disclosed processes may be altered within the scope of the invention.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A content addressable storage device configured to maintain content address mapping disclosed. In one embodiment, a data object to be stored on the content addressed storage device and a local data object identifier by which the data object is known to the sending source (e.g., application) are received. A content address to be associated with the data object on the content addressed storage device is determined based at least in part on the contents of the data object. The data is stored object on the content addressed storage device in a storage location associated with the content address. A mapping that associates the local data object identifier with the content address is maintained on the content addressed storage device.

Figure 1:
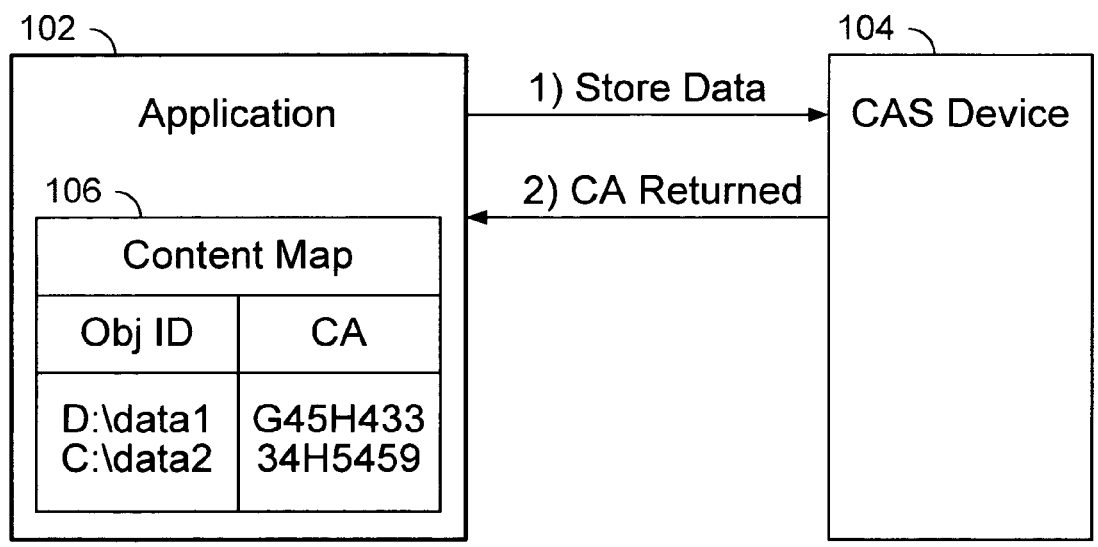
FIG. 1 is a block diagram illustrating a typical prior art content addressed storage (CAS) device.

FIG. 1 is a block diagram illustrating a typical prior art content addressed storage (CAS) device. An application 102 sends data to a CAS device 104 to be stored. The CAS device 104 stores the data and returns to the application 102 a content address (CA) associated with the data. The application 102 maintains a content map 106 that associates the local data object identifier (e.g., file name and/or path) associated with each file or other set of data sent to the CAS device 104 for storage with the corresponding content address returned by the CAS device 104 to the application 102 for the data. In the example shown, a data object "D:\data1" was stored by application 102 on CAS device 104 and the content address "G45H433" was returned by CAS device 104 to indicate to application 102 where on the CAS device the data object "D:\data1" was stored. If in the future application 102 needed to access the data object "D:\data1" as stored on CAS device 104, application 102 would look up the corresponding content address in the content map 106 and use the content address to access the data on CAS device 104. As noted above, under the approach shown in FIG. 1, the application 102 must be configured to maintain the content map 106, which requires that additional functionality be built into application 102 and consumes additional memory and processing resources on the host(s) on which application 102 is running.

Figure 2:
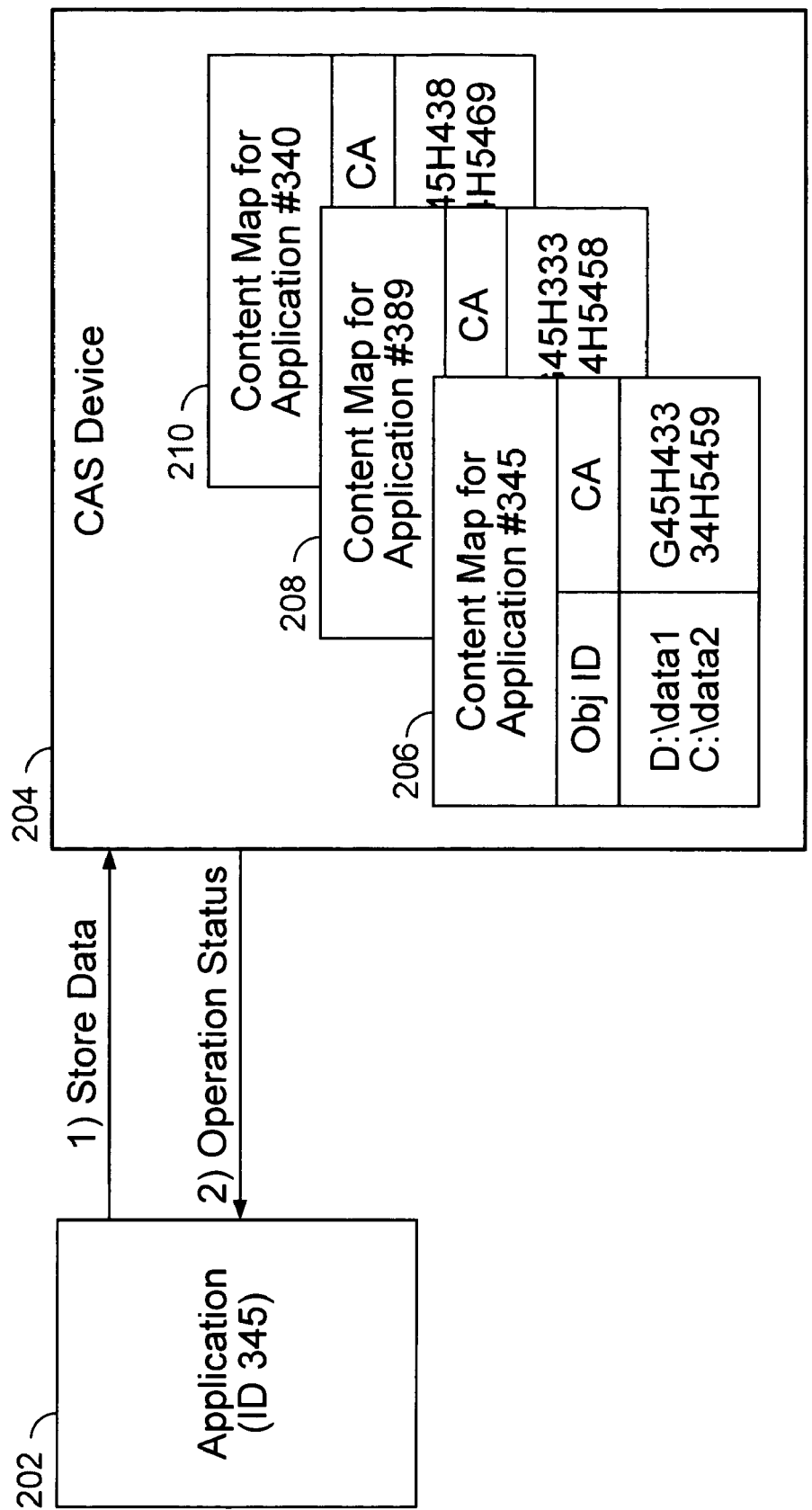
FIG. 2 is a block diagram of a content addressable storage device configured to maintain content address mapping.

FIG. 2 is a block diagram of a content addressable storage device configured to maintain content address mapping. An application 202 sends data to a CAS device 204 to be stored. The application provides in addition a unique identifier associated with the application and a local data object identifier by which the sent data is known to the application and/or a local host on which the application is running. The CAS device 204 computes a content address based at least in part on the data and stores the data in a location associated with the content address. The CAS device 204 then stores in a content map 206 maintained on the CAS device 204 for the sending application 202 an association between the local data object identifier by which the application 202 knows the data and the content address associated with the data on the CAS device 204. In the example shown, the content map 206 maintained on and by CAS device 204 for the application 202 is one of a plurality of content maps 206-210 maintained by CAS device 204, one for each application that has stored data on CAS device 204.

Each of the content maps 206-210 is identified by a unique application identifier (e.g., "Application #345") associated with the application with which the content map is associated. Because the content map for each application is maintained on and by the CAS device 204, applications such as application 202 need not be configured to maintain a mapping between content addresses generated by the content addressed storage device and local data object identifiers. Instead, the application can simply access or refer to the data stored on the CAS by the local data object identifier by which it is known on the local host on which the application is running. This approach enables a content addressed storage device to be exposed on the local host as an additional drive, for example, even though a CAS device typically does not have a native file system such as would otherwise be required to access the CAS device in the same way as a local drive. In the example shown in FIG. 2, once the data has been stored and the associated content map updated, the CAS device 204 returns to the application 202 an operation status report or message, e.g., one indicating the data was (or was not, if applicable) stored successfully.

In one embodiment, the application 202 accesses the CAS device 204 via a network, such as a TCP/IP network (not shown). The CAS device 204 has a communication interface, such as a network interface card (NIC), to facilitate such communication. The CAS device 204 in addition includes a memory used to store the content maps 206-210, one or more storage nodes configured to store data sent to the CAS device 204 by applications such as application 202, and one or more processors configured to perform the data storage, retrieval, and management functions of the CAS device 204 and the content mapping operations described herein. One or more of the one or more processors may include a general purpose processor (e.g., CPU) configured by software to perform such functions and operations, and/or an application specific integrated circuit, field programmable logic device, or other device so configured.

Figure 3:
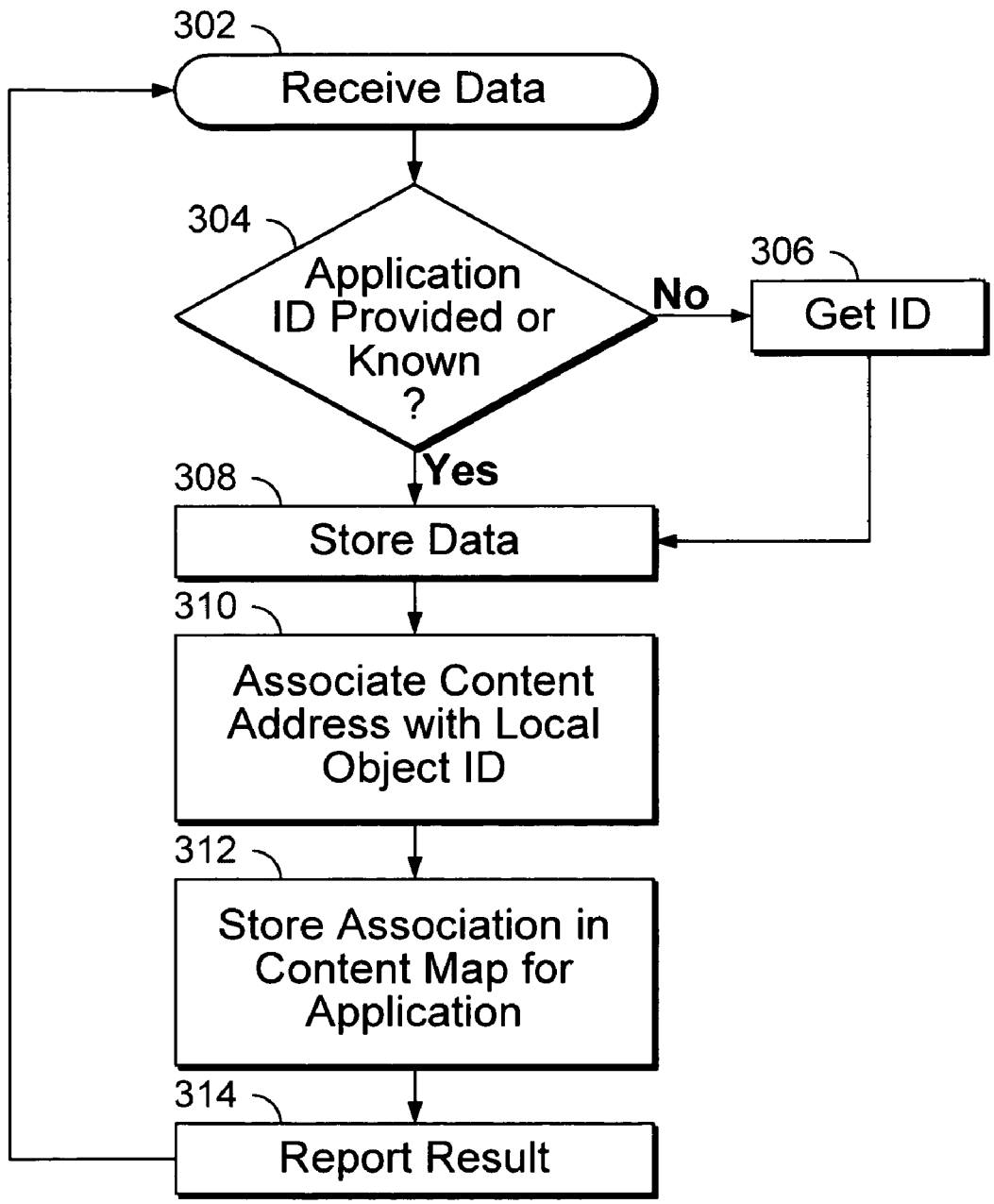
FIG. 3 is a flow chart illustrating a process used in one embodiment to maintain content mapping on a CAS device.

FIG. 3 is a flow chart illustrating a process used in one embodiment to maintain content mapping on a CAS device. In one embodiment, the process of FIG. 3 runs on a CAS device such as CAS device 204 of FIG. 2. Data is received (302). If the unique application identifier of the sending application has been provided with the data and/or is otherwise known (e.g., based on other information received with the data, the connection on which the data was received, etc.) (304), the data is stored (308). If the application identifier has not been provided and is not otherwise known (304), the application identifier is obtained (306) and the data is stored (308).

In one embodiment, each application generates its own identifier and provides the identifier to the CAS device, which acknowledges and authorizes the identifier if it is unique but instead rejects the identifier and requests that the application propose a different identifier for the application in the event the identifier proposed by the application is already associated on the CAS device with another application. In one alternative embodiment, the CAS device is configured to generate a unique application identifier for each application with which it interacts. In one such embodiment, 306 includes generating a unique identifier for the application and informing the application of the unique identifier assigned to it, so that the application can include the unique identifier with future data sent to the CAS device for storage. In one embodiment, the application provides its unique identifier by including the identifier in a prescribed header or other field of a message used by the application to send data to the CAS device for storage. In one alternative embodiment, a third party registry or similar service assigns globally unique application identifiers to registering applications. In one such embodiment, 306 includes obtaining an identifier for the application from such a third party and/or requesting that the application do so.

Storing the data (308) includes calculating a content address for the data based at least in part on the content being stored. This content address is associated on the CAS device with the local data object identifier (e.g., file name and/or path) by which the stored data object is known to the sending application (e.g., the file name and/or path for the data object on a local host on which the application is running) (310). The association between the content address and the corresponding local data object identifier is stored on the CAS device in a content map associated with the sending application (312). In one embodiment, 310 and 312 are combined and the association between the content address and the corresponding local data object identifier is made by storing the corresponding values in associated locations in a content map associate with the sending application. A result of the operation is reported to the sending application (314), after which the next data to be stored is received and processed (302). As noted above, the result reported may include a report that the requested data storage operation was completed successfully. There is no need to report the content address, because the content map maintained on and by the CAS device makes it possible for the application to access (e.g., retrieve) data stored by the application on the CAS device by providing its application identifier and the local data object identifier by which the data is known to the application, as described more fully below.

Figure 4:
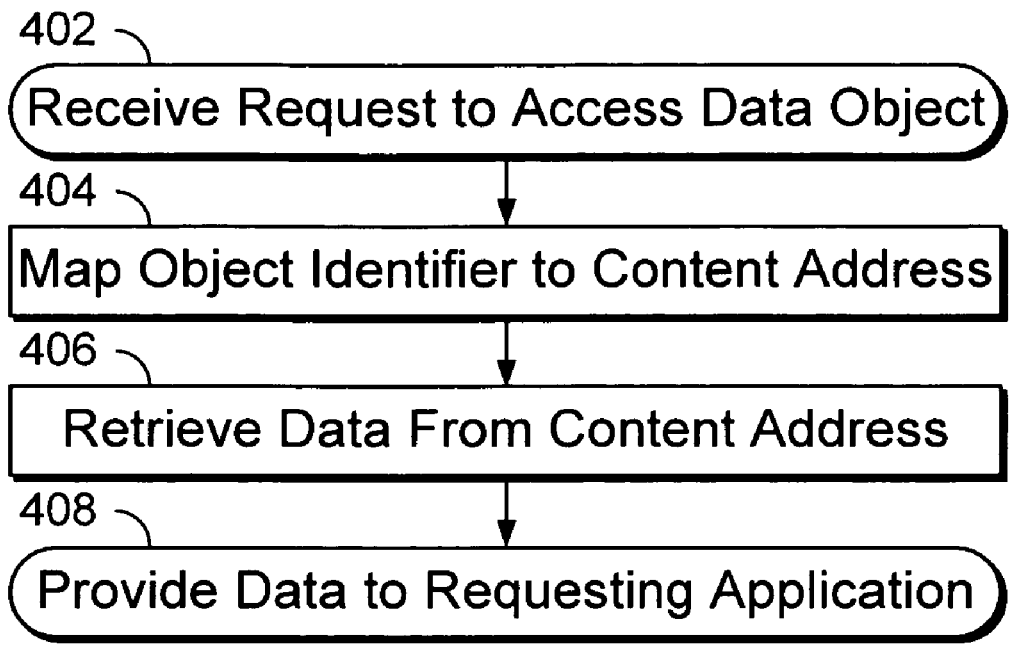
FIG. 4 is a flow chart illustrating a process used in one embodiment to process requests to access data stored on a CAS device.

FIG. 4 is a flow chart illustrating a process used in one embodiment to process requests to access data stored on a CAS device. A request to receive a data object stored on the CAS device is received (402). In one embodiment, the request includes an application identifier associated with the requesting application and a local data object identifier by which the requested data is known by the requesting application. The local data object identifier is mapped to a corresponding content address on the CAS device (404). The data is retrieved from a location associated with the content address (406) and provided to the requesting application (408).

Figure 5:
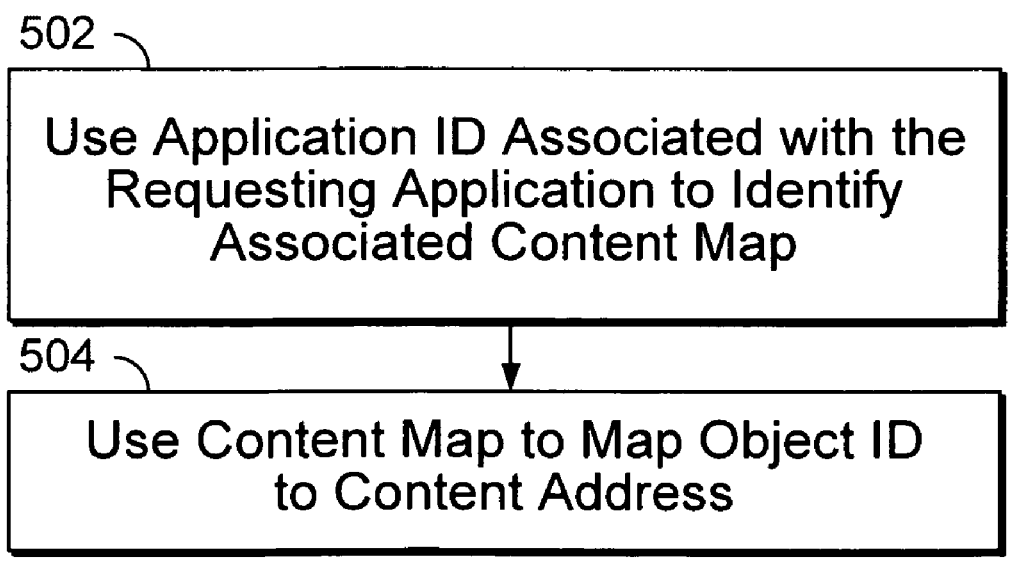
FIG. 5 is a flow chart illustrating a process used in one embodiment to map a local data object identifier to a corresponding content address.

FIG. 5 is a flow chart illustrating a process used in one embodiment to map a local data object identifier to a corresponding content address. In one embodiment, the process of FIG. 5 is used to implement 404 of FIG. 4. An application identifier associated with the requesting application is used to identify a content map associated with the requesting application (502). In one embodiment, the request includes and/or is accompanied by the application identifier of the requesting application. In one embodiment, the content map is maintained on and by the CAS device. The content map is used to map a local data object identifier (e.g., file name and/or path) associated with the requested data to a corresponding content address on the CAS device (504). In one embodiment, the local data object identifier is included in the request received from the requesting application. The requesting application identifies the data using the local data object identifier and therefore never needs to learn or track the content address associated with the data on the CAS device.

Referring to the example shown in FIG. 2, an application such as application 202 would access data in one embodiment by sending to the CAS device 204 a request identifying the data by the local data object identifier by which the data is known to the application 202 (e.g., "D:\data1") and providing the application identifier for the application (e.g., "345"). The CAS device 204 would then identify content map 206 as the applicable content map, and then use content map 206 to map the local data object identifier included in the request to the corresponding content address associated with the requested data on the CAS device 204 (e.g., by mapping object identifier "D:\data1" to content address "G45H433"). The CAS device 204 would then use the content address to retrieve the corresponding data and provide it to the requesting application 202 in response to the request.

Figure 6:
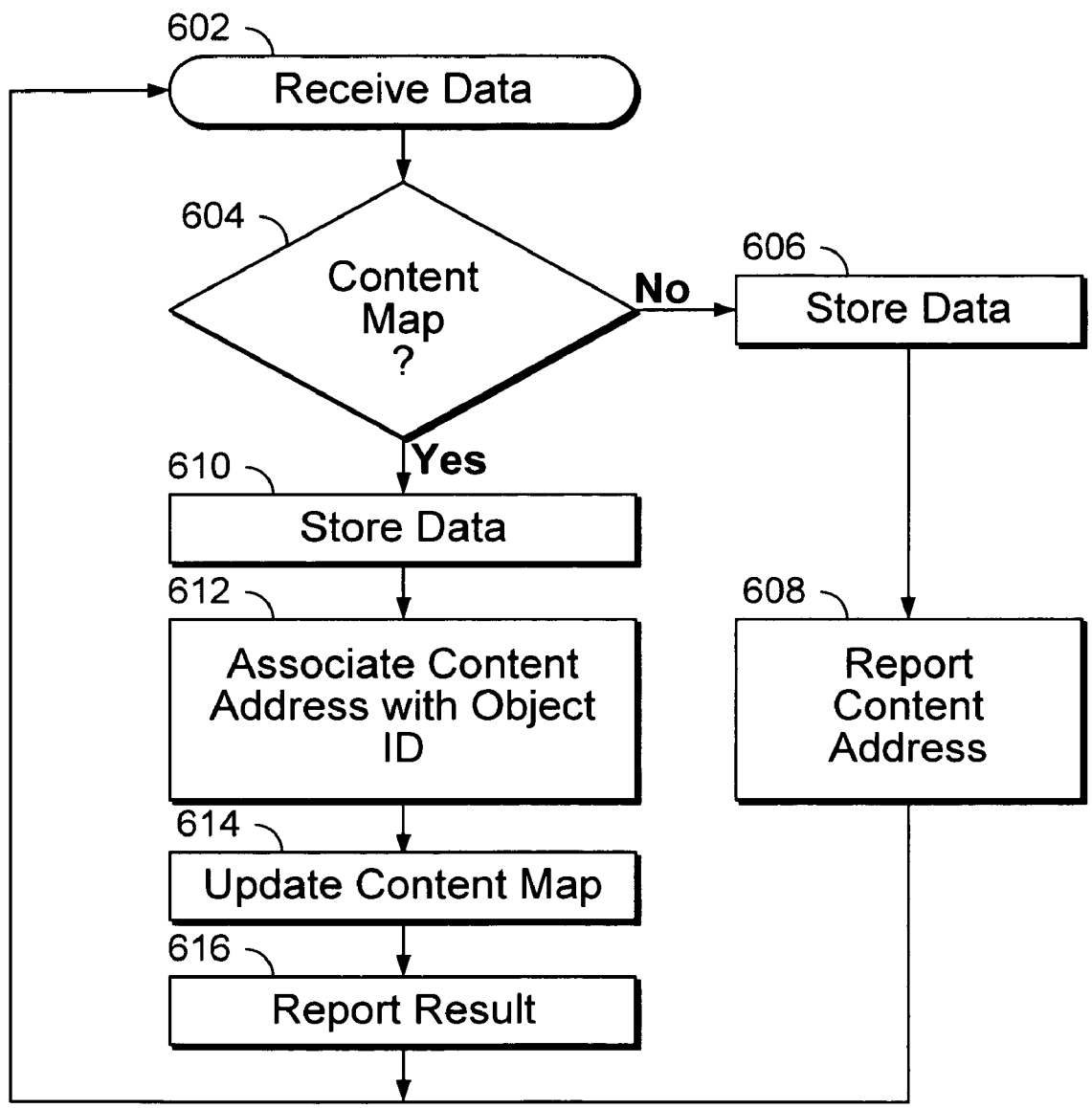
FIG. 6 is a flow chart of a process used in one embodiment to store data on a CAS device.

FIG. 6 is a flow chart of a process used in one embodiment to store data on a CAS device. In the example shown, an application (or other requesting process, system, or entity) may optionally be configured to maintain a mapping of local data object identifiers to corresponding content addresses on the CAS device or instead to rely on the CAS device to maintain such a mapping for the application. This approach enables the CAS device to operate both with applications configured to maintain such a mapping, such as large data storage/backup applications and/or legacy application configured to maintain such a mapping for data store on a CAS device as well as with applications, such as lighter weight and/or newer applications, that are not configured to maintain such a mapping. In one embodiment, the process of FIG. 6 is implemented on a CAS device such as CAS device 204 of FIG. 2. Data is received (602). It is determined whether the application from which the data was received is one for which the CAS device is maintaining a content map (604). In one embodiment, whether the data was received from a source (e.g., application) for which the CAS device maintains a content map is determined by reading the value of a flag or other data field in a header or other portion of a message used by the sending application to send the data to the CAS device. In one embodiment, the determination is made by determining whether the application supplied an application identifier and concluding a content map is maintained on the CAS device if an application identifier is present. In one embodiment, the determination is made by using an application identifier associated with the data to determine, e.g., by reading a table, whether the application is one for which a content map is maintained on the CAS device. The CAS device may be configured to make such a determination either by an administrator or user or, e.g., by the application itself, e.g., by sending one or more configuration messages as prescribed in a proprietary or publicly available API or other interface. If the data was received from a source (e.g., application) for which a content map is not maintained on the CAS device, the data is stored (606) and the associated content address is reported to the sending application (608), after which the process is repeated for the next received data. If the data was received from a source for which a content map is maintained on the CAS device, the data is stored (610), the content address associated with the data on the CAS device is associated with the corresponding local data object identifier by which the data object is known to the sending application (or other source) (612), the content map maintained on the CAS device for the sending application is updated (614), and the result of the operation (e.g., success, failure, etc.) is reported to the sending application (616), after which the process repeats for the next received data.

Figure 7:
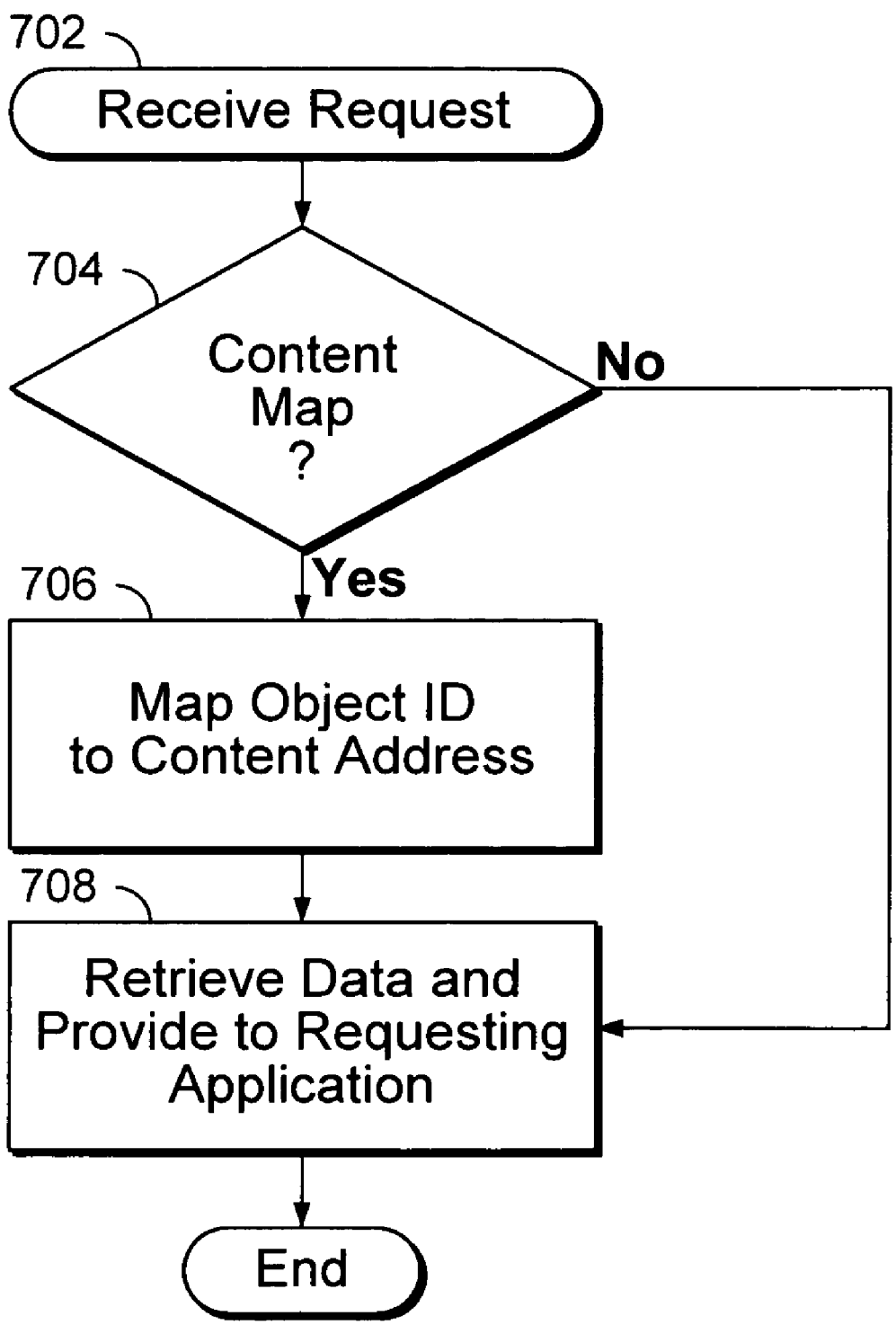
FIG. 7 is a flow chart of a process used in one embodiment to process requests to access data on a CAS device that may be configured to maintain a content map for some applications (or other sources) but not others.

FIG. 7 is a flow chart of a process used in one embodiment to process requests to access data on a CAS device that may be configured to maintain a content map for some applications (or other sources) but not others. A request to access a data object stored on the CAS device is received (702). It is determined whether the requesting application (or other source) is one for which a content map is maintained on the CAS device. In one embodiment, one or more of the approaches described above in connection with 604 are used to make the determination in 704. In one embodiment, the determination in 704 is made based on whether the request includes a content address for the data object. If the requesting application is not one for which a content map is maintained on the CAS device (704), the requested data is retrieved (e.g., using a content address included in and/or provided with the request) and provided to the requesting application (708), after which the process ends. If the requesting application is one for which a content map is maintained on the CAS device (704), the local data object identifier associated with the request data is mapped to a corresponding content address, e.g., using the content map maintained on the CAS device for the requesting application (706), and the content address is used to retrieve the requested data and provide it to the requesting application (708), after which the process ends.

Using the approaches described herein, applications that are not configured to maintain a mapping of content addresses to local data object identifiers can still use a CAS device to store data, thereby simplifying application development, reducing consumption of resources on the local host on which the application is running, and expanding the universe of applications able to use a CAS device for off-system storage.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method for storing data on a content addressed storage device, comprising:
   receiving from a sending source a request associated with storing a data object on the content addressed storage device wherein the request includes a local data object identifier by which the data object is known to the sending source and the sending source is external to the content addressed storage device; and
   at the content addressed storage device and in response to receiving the request associated with storing:
      determining, based at least in part on the contents of the data object, a content address to be associated with the data object on the content addressed storage device;
      storing the data object on the content addressed storage device in a storage location associated with the content address; and
      storing on the content addressed storage device a mapping that associates the local data object identifier with the content address.

2. A method as recited in claim 1, wherein the sending source comprises a sending application.

3. A method as recited in claim 1, wherein storing on the content addressed storage device a mapping that associates the local data object identifier with the content address comprises updating a content map associated with the sending source.

4. A method as recited in claim 1, wherein the local data object identifier includes a file name associated with the data object on a local host associated with the sending source.

5. A method as recited in claim 1, wherein the local data object identifier includes a file path associated with the data object on a local host associated with the sending source.

6. A method as recited in claim 1, wherein the data object comprises a file.

7. A method as recited in claim 1, further comprising reporting to the sending source that the data object was stored successfully.

8. A method as recited in claim 1, further comprising determining whether a source identifier associated with the sending source is known and, if the source identifier is known, using the source identifier to identify a content map associated with the sending source, wherein said mapping is stored in said content map.

9. A method as recited in claim 1, further comprising:
   receiving from a requestor a request to access the data object, the request from the requestor including the local data object identifier;
   determining the content address associated with the local data object identifier using (1) the mapping and (2) the local data object identifier included in the request to access the data object;
   retrieving the data object using the content address; and
   providing the data object to the requestor.

10. A method as recited in claim 9, wherein the requestor is the sending source.

11. A method as recited in claim 10, wherein the sending source comprises a sending application.

12. A content addressed storage device, comprising:
   a communication interface configured to receive from a sending source a request associated with storing a data object on the content addressed storage device wherein the request includes a local data object identifier by which the data object is known to the sending source and the sending source is external to the content addressed storage device;
   a memory; and
   a processor at the content addressed storage device and configured to, in response to receiving the request associated with storing:
      determine based at least in part on the contents of the data object a content address to be associated with the data object on the content addressed storage device;
      store the data object in the memory at a storage location associated with the content address; and
      storing on the content addressed storage device a mapping that associates the local data object identifier with the content address.

13. A content addressed storage device as recited in claim 12, wherein the processor is configured to store on the content addressed storage device a mapping that associates the local data object identifier with the content address at least in part by updating a content map associated with the sending source.

14. A content addressed storage device as recited in claim 12, wherein the processor is further configured to report to the sending source that the data object was stored successfully.

15. A content addressed storage device as recited in claim 12, wherein the processor is further configured to determine whether a source identifier associated with the sending source is known and, if the source identifier is known, use the source identifier to identify a content map associated with the sending source, wherein said mapping is stored in said content map.

16. A content addressed storage device as recited in claim 12, wherein:
   the communication interface is further configured to receive from a requestor a request to access the data object, the request from the requestor including the local data object identifier; and
   the processor is further configured to determine the content address associated with the local data object identifier using (1) the mapping and (2) the local data object identifier included in the request to access the data object, retrieve the data object using the content address, and provide the data object to the requestor.

17. A computer program product for storing data on a content addressed storage device, the computer program product being embodied in a recordable computer readable medium and comprising computer instructions for:
   receiving from a sending source a request associated with storing a data object on the content addressed storage device wherein the request includes a local data object identifier by which the data object is known to the sending source and the sending source is external to the content addressed storage device; and
   at the content addressed storage device and in response to receiving the request associated with storing:
      determining based at least in part on the contents of the data object a content address to be associated with the data object on the content addressed storage device;
      storing the data object on the content addressed storage device in a storage location associated with the content address; and storing on the content addressed storage device a mapping that associates the local data object identifier with the content address.

18. A computer program product as recited in claim 17, wherein storing on the content addressed storage device a mapping that associates the local data object identifier with the content address comprises updating a content map associated with the sending source.

19. A computer program product as recited in claim 17, further comprising computer instructions for reporting to the sending source that the data object was stored successfully.

20. A computer program product as recited in claim 17, further comprising computer instructions for determining whether a source identifier associated with the sending source is known and, if the source identifier is known, using the source identifier to identify a content map associated with the sending source, wherein said mapping is stored in said content map.

21. A computer program product as recited in claim 17, further comprising computer instructions for:
   receiving from a requestor a request to access the data object, the request from the requestor including the local data object identifier;
   determining the content address associated with the local data object identifier using (1) the mapping and (2) the local data object identifier included in the request to access the data object;
   retrieving the data object using the content address; and
   providing the data object to the requestor.

* * * * *